United States Patent Office 2,852,511
Patented Sept. 16, 1958

2,852,511

9α-HALO STEROIDS OF THE PREGNANE SERIES AND PROCESS THEREFOR

Josef Fried, New Brunswick, N. J., assignor to Olin Mathieson Chemical Corporation, a corporation of Virginia No Drawing. Application March 10, 1954
Serial No. 417,489

52 Claims. (Cl. 260—239.55)

This application is a continuation-in-part of my application Serial No. 343,243, filed March 18, 1953, now abandoned.

This invention relates to the synthesis of valuable steroids.

One of the objects of this invention is the provision of an advantageous process of preparing 11β-hydroxy and 11-keto steroids of the pregnane (including pregnene) series, especially cortisone and hydrocortisone.

Another object of this invention is the provision of certain compounds useful in the preparation of physiologically-active steroids and (in certain cases) also useful for their own physiological action.

The compounds of this invention comprise: (A) 9β,11β-oxido steroids of the pregnane series; and (B) steroids of the pregnane series having a 9α-halogen substituent and a 11-keto or 11β-hydroxy substituent.

The process of this invention essentially comprises converting a 11α-hydroxy steroid of the pregnane series into a 11α-sulfonic acid ester thereof, especially the 11α-tosylate or 11α-mesylate thereof, converting the latter into the corresponding $\Delta^{9,11}$-compound, and converting said $\Delta^{9,11}$-compound into the corresponding 9α-halo 11β-hydroxy compound. The latter may be dehalogenated to obtain the corresponding 11β-hydroxy compound (e. g. 17α-hydroxy-corticosterone acetate), or oxidized to obtain the corresponding 11-keto compounds (e. g., 9α-halocortisone).

Among the compounds of this invention are those of the general formula

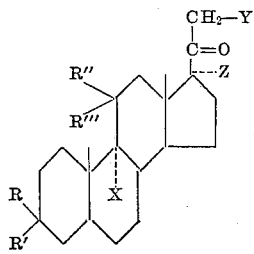

the 4,5 position being double-bonded or saturated, wherein R is —H, R' is —OH, or together R and R' is =O or a group convertible thereto by hydrolysis, R" is H, R'" is (β)—OH, or together R" and R'" is =O, X is an (α) halogen group, Y is a member of the class consisting of —H, —OH, and —O-(acyl), and Z is a member of the class consisting of —H and (α) —OH. [Among the groups convertible to a keto group are the acetal, especially cyclic acetal, groups.]

The 11α-sulfonyloxy-steroids may be obtained from the corresponding 11α-hydroxy steroid by reaction with the appropriate sulfonyl halide. In the case of compounds containing a 21-hydroxy group, this is done after protection of this group by forming an ester (especially lower fatty acid ester) thereof, e. g., by acetylation with acetic anhydride in the presence of pyridine. These reactants include, inter alia, alkylsulfonyl halides (such as methanesulfonyl chloride) and arylsulfonyl halides (such as p-bromo-benzenesulfonyl chloride and p-toluenesulfonyl chloride). The preferred reagents are methanesulfonyl and p-toluenesulfonyl halides, the resulting esters being referred to respectively as "mesylates" and "tosylates."

The conversion of the 11α-sulfonic acid esters of the steroids into the corresponding $\Delta^{9,11}$-compound is best effected by heating the ester with an alkali metal salt of a lower fatty acid in a substantially anhydrous liquid lower fatty acid, e. g., (anhydrous) sodium acetate in (glacial) acetic acid, or potassium formate in formic acid. This conversion may also be effected by treatment with sodium iodide, potassium iodide or lithium bromide in acetone or glacial acetic acid, preferably the latter.

The conversion of the $\Delta^{9,11}$ compound into the corresponding 9α-bromo 11β-hydroxy compound, for example, may be effected by reaction with an N-bromo-amide (including imide) of a carboxylic acid (including derivatives), inter alia, N-bromoacetamide (or N-bromo-amide of other lower fatty acid), N-bromosuccinimide, and dibromodimethylhydantoin. Preferably this conversion is effected in the presence of perchloric acid or other relatively strong acid (e. g. p-toluenesulfonic acid or trichloracetic acid) not forming an ester with the 11β-hydroxy compound. This conversion is an advantageous method of preparing bromo 11β-hydroxy steroids generally (e. g. from $\Delta^{11,12}$ steroids also), giving higher yields of bromo 11β-hydroxy steroids because no by-product esters are formed.

The oxidation of the 9α-halo 11β-hydroxy steroid to the corresponding keto compound (where desired) may be effected by the conventional oxidizing procedures, e. g. chromic acid in glacial acetic acid; and the dehalogenation of the 9α-halo 11β-hydroxy steroid to the corresponding (9 unsubstituted) 11β-hydroxy steroid may be effected by treatment with zinc dust in a dilute lower alcohol (e. g. ethanol or methanol) or a lower fatty acid (e. g. acetic acid).

Among the 11α-hydroxy steroids of the pregnane series utilizable in the process of this invention are $\Delta^{4}$-pregnene-11α,17α,21-triol-3,20-dione (also known as 11-epi-17α-hydroxycorticosterone, or epi F), 11α-hydroxyprogesterone, 11α,17α-dihydroxyprogesterone, and epi-corticosterone. The preparation of these compounds is disclosed, for example, in J. Am. Chem. Soc., 74, 3962 (1952).

The $\Delta^{4}$ steroids of the pregnane series having an α-halogen substituent and a 11-keto or 11β-hydroxy substituent (and the esters of those having a 21-hydroxy group), contrary to what would have been predicted, possess corticoid activity in the liver glycogen assay. [The compounds of this invention having a 21-hydroxy group may be directly obtained as, or readily converted into, their fatty acid esters, especially lower fatty acid esters.]

Another advantage of the synthesis route of this invention is that it permits the introduction of radioactive halogen or tritium into the stable 9-position in a final step. For a clearer understanding of the foregoing general and following detailed description of the invention, reference is made to the following schematic analysis (employing representative reagents, "Ts" being p-toluene sulfonyl, and "Ms" being methanesulfonyl):

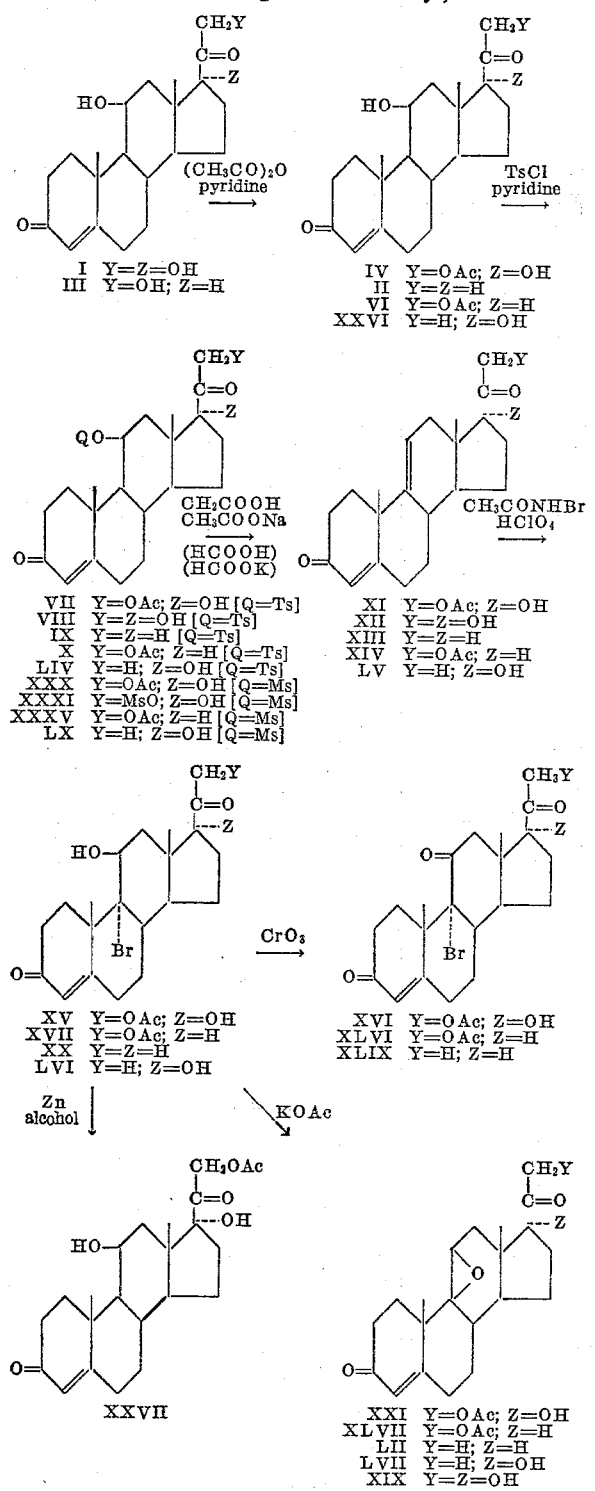

The following examples are illustrative of the invention (all temperatures being in centigrade, and all dilutions with water unless indicated otherwise):

EXAMPLE 1

Preparation of 9α-bromocortisone acetate (XVI)

(a) Epi-F 21-acetate (IV) from epi-F (Δ⁴-pregnene-11α,17α,21-triol-3,20-dione) (I).—To a solution of 50 g. pure epi-F [M. P. 217°, $[\alpha]_D^{23}$ +117° (CHCl₃)] in 200 ml. anhydrous pyridine immersed in an ice bath is added drop-wise, with stirring, a solution of 14.3 ml. acetic anhydride in 40 ml. of pyridine. Upon completion of the addition, requiring about two hours, the mixture is kept at 0° for four more hours, and is then allowed to warm up to room temperature (23°) overnight. The acetylation mixture is then concentrated in vacuo until most of the pyridine and acetic anhydride has evaporated, the resulting residue being dissolved in chloroform and the chloroform solution washed in the order given with water, dilute hydrochloric acid, dilute sodium bicarbonate and again with water. The chloroform solution is dried with sodium sulfate and the solvent removed in vacuo. The dried amorphous residue (about 69 g.), which represents the essentially pure 21-acetate of epi-F, is used in the following reaction without further purification.

(b) Δ⁴-pregnene-11α,17α,21-triol-3,20-dione 11α-tosylate 21-acetate (VII) from Δ⁴-pregnene-11α,17α,21-triol-3,20-dione 21-acetate (IV).—The amorphous residue obtained in a (about 69 g.) is dissolved in 250 ml. anhydrous pyridine, and to the resulting solution immersed in an ice bath there is added drop-wise, with stirring, a solution of 70 g. pure p-toluenesulfonyl chloride in 100 ml. alcohol-free chloroform. The addition requires about two hours, after which the reaction mixture is allowed to remain at 0° for another four hours, and eventually at room temperature overnight. Ten grams of ice is added, and after one-half hour the solution is concentrated in vacuo to a small volume. The resulting residue is taken up in chloroform and water, and the chloroform solution is washed with cold dilute hydrochloric acid, dilute sodium bicarbonate and finally with water. The chloroform solution is dried over sodium sulfate and evaporated to dryness in vacuo. The crystalline residue (about 88.4 g.) is triturated with 200 ml. absolute ethanol, and the mixture is filtered after short cooling in the refrigerator. The first crop of crystals amounts to about 58.6 g., and melts at about 165–166° (dec.). An additional 5.6 g. of material is obtained by concentration of the mother liquors. A small sample, recrystallized for analysis from ethyl acetate and dried at 56°, had the following properties: M. P., about 165.5–166°; $[\alpha]_D^{23}$ +106° (c., 1.0 in CHCl₃); analysis [calculated for C₃₀H₃₈O₈S: C, 64.51; H, 6.81; S, 5.73; found (approximately): C, 64.55; H, 6.84; S, 5.77].

(b: alternative) Deacetylation of Δ⁴-pregnene-11α,17α,21-triol-3,20-dione 11α-tosylate 21-acetate (VII).—To a solution of 115 mg. Δ⁴-pregnene-11α,17α,21-triol-3,20-dione 11α-tosylate 21-acetate in 1 ml. of chloroform is added 5.5 ml. methanol. The resulting mixture is warmed to 40°, and to it is added a solution of 86 mg. potassium bicarbonate in 1.6 ml. water. The yellow solution is allowed to remain at room temperature for 18 hours, and after the addition of 2 ml. water, is concentrated in vacuo to small volume. The residual mixture is extracted with chloroform and the chloroform solution is washed with water and dried over sodium sulfate. Removal of the solvent by evaporation leaves a residue (about 119 mg.) which crystallizes readily from acetone. The pure Δ⁴-pregnene-11α,17α,21-triol-3,20-dione 11α-tosylate (VIII) obtained has the following properties: M. P., about 130.5–131° (dec.); $[\alpha]_D^{23}$ +70° (c., 1.0 in CHCl₃); analysis [calculated for C₂₈H₃₆O₇S: C, 65.12; H, 6.97; found (approximately): C, 65.29; H, 7.22].

A sample of this Δ⁴-pregnene-11α,17α,21-triol-3,20-dione 11α-tosylate, on reacetylation with pyridine and acetic anhydride yields the 21-acetate (VII), M. P. 164–166° (dec.).

(c) Δ⁴,⁹⁽¹¹⁾-pregnadiene-17α,21-diol-3,20-dione 21-acetate (XI) from Δ⁴-pregnane-11α,17α,21-triol-3,20-dione 11α-tosylate 21-acetate (VII).—A solution of 58.6 g. Δ⁴-pregnene-11α,17α,21-triol-3,20-dione 11α-tosylate 21-acetate and 117.2 g. anhydrous sodium acetate in one l. of glacial acetic acid is heated under reflux for one hour. After evaporation of most of the acetic acid in vacuo, the residue is taken up in chloroform and extracted with water then with dilute sodium bicarbonate and again with water. The chloroform solution containing the desired $\Delta^{4,9(11)}$-pregnadiene-17α,21-diol-3,20-dione 21-acetate (XI) is dried over sodium sulfate, and the chloroform is removed in vacuo. The crystalline residue (about 40.6 g.) is triturated with 140 ml. of acetone, and the resulting suspension is filtered with suction. Recrystallization of the dried crystals (about 33 g.) from ethyl acetate yields pure $\Delta^{4,9(11)}$-pregnadiene-17α,21-diol-3,20-dione 21-acetate, having the following properties: M. P., about 234–235.5°, $[\alpha]_D^{26}$ +117° (c., 1.0 in CHCl$_3$), [calculated for C$_{23}$H$_{30}$O$_5$; C, 71.50; H, 7.77; found (approximately): C, 71.57; H, 7.85].

(c: alternative).—$\Delta^{4,9(11)}$-pregnadiene-17α,21-diol-3,20-dione 21-acetate is also prepared by refluxing a solution of 150 mg. $\Delta^4$-pregnene-11α,17α,21-triol-3,20-dione 11α-tosylate 21-acetate and 250 mg. of potassium formate in 215 ml. 98% formic acid for one hour, and treating the resulting mixture as described in c.

(c: alternative) Hydrolysis of $\Delta^{4,9(11)}$-pregnadiene-17α,21-diol-3,20-dione 21-acetate (XI).—To a solution of 600 mg. $\Delta^{4,9(11)}$-pregnadiene-17α,21-diol-3,20-dione 21-acetate in 8 ml. warm chloroform is added 68 ml. methanol and a solution of 920 mg. potassium bicarbonate in 16 ml. water. The mixture is refluxed for one hour and then allowed to remain at room temperature for 18 hours. After removal of the methanol and chloroform in vacuo, the aqueous mixture is extracted with chloroform, and the chloroform extract is washed with water and dried over sodium sulfate. Evaporation of the chloroform in vacuo leaves $\Delta^{4,9(11)}$-pregnadiene-17α,21-diol-3,20-dione (XII) as a crystalline residue difficultly soluble in most common organic solvents. Recrystallization from peroxide-free tetrahydrofuran yields the pure substance, having the following properties: M. P., about 244–247°; $[\alpha]_D^{23}$ +100° (c., 0.4 in CHCl$_3$); analysis [calculated for C$_{21}$H$_{28}$O$_4$: C, 73.27; H, 8.14; found (approximately) C, 73.14; H, 8.09].

(d) 9α-bromo-$\Delta^4$-pregnene-11β,17α,21-triol-3,20-dione 21-acetate (XV) from $\Delta^{4,9(11)}$-pregnadiene-17α,21-diol-3,20-dione 21-acetate (XI).—6.00 g. finely pulverized $\Delta^{4,9(11)}$-pregnadiene-17α,21-diol-3,20-dione 21-acetate is dissolved in 600 ml. hot pure dioxane. After adding 60 ml. water, the solution is rapidly cooled to room temperature, while agitating. Under these conditions, the $\Delta^{4,9(11)}$-pregnadiene-17α,21-diol-3,20-dione 21-acetate precipitates in the form of micro-crystals. To the resulting suspension is added 3.00 grams N-bromoacetamide and 30 ml. 1 N aqueous perchloric acid and the mixture is gently agitated from time to time until it has become completely clear, which requires between 9 and 11 minutes. After a total reaction period of one hour, dilute sodium solution is added until the yellow solution has been almost completely decolorized. 750 ml. chloroform is then added, and the small aqueous phase floating on top is separated off. The chloroform-dioxane phase containing the bromohydrin (XV) is washed with dilute sodium bicarbonate and with water and dried over sodium sulfate. Removal of the solvents in vacuo leaves an amorphous residue (about 8.0 g.), which is dissolved in 30 ml. acetone. Crystallization ensues rapidly, and furnishes about 5.85 g. of light cream-colored crystals having the following properties: M. P. about 132–133° (dec.); $[\alpha]_D^{22}$ +133° (c., 0.75 in CHCl$_3$); and $$\lambda_{max}^{alc.}\ 243\ m\mu\ (\epsilon=14,500)$$

An additional yield of about 0.61 g. of material is obtained from the acetone mother liquors. The total yield is therefore about 6.46 g. or about 86% of theory. An analytical sample dried in vacuo at room temperature, analyzes as follows: [calculated for C$_{23}$H$_{31}$O$_6$Br: C, 57.17; H, 6.42; Br, 16.54; found (approximately): C, 57.40; H, 6.56; Br, 16.11]. Using $\Delta^{4,9(11)}$-pregnadiene-17α-21-diol-3,20-dione (XII) in place of its acetate (XI) in the foregoing procedure, there is obtained 9α-bromo $\Delta^4$-pregnene-11β,17α,21-triol-3,20-dione.

When the reaction is carried out with sulfuric acid instead of perchloric acid, the yield is about 45% of theory, presumably due to the formation of the 11-sulfate ester of XV and the $\Delta^{4,7,9(11)}$ derivative as described in the section following.

(d: alternative) $\Delta^{4,7,9(11)}$-pregnatriene-17α,21-diol-3-20-dione from $\Delta^{4,9(11)}$-pregnadiene-17α,21-diol-3,20-dione 21-acetate (XI).—3.0 g. $\Delta^{4,9(11)}$-pregnadiene-17α,21-diol-3,20-dione 21-acetate is reacted with 1.34 g. N-bromoacetamide in a medium consisting of 300 ml. dioxane, 30 ml. water, and 30 ml. of 1 N H$_2$SO$_4$ as described in section d. From the chloroform-dioxane phase is isolated about 1.80 g. of $\Delta^4$-9α-bromopregnene-11β,17α,21-triol-3,20-dione 21-acetate (XV). The aqueous phase, when allowed to stand in the refrigerator for 40 days, deposits crystals which can be extracted into chloroform. The chloroform extract is washed with sodium bicarbonate solution and water, and dried over sodium sulfate. Evaporation of the solvent leaves a crystalline residue (about 231 mg.) consisting of $\Delta^{4,7,9(11)}$-pregnatriene-17α-21-diol-3,20-dione, which after recrystallization from acetone has the following properties: M. P. about 219–221°; $[\alpha]_D^{23}$ +233° (c., 0.99 in CHCl$_3$);

$\lambda_{max}^{alc.}$ 243 m$\mu$ ($\epsilon$=18,000), shoulders at 237 m$\mu$ ($\epsilon$=16,600) and 250 m$\mu$ ($\epsilon$=14,700); $\lambda_{max}^{Nujol}$ 3.05$\mu$, 5.77$\mu$, 5.87$\mu$, 6.00$\mu$ analysis [calculated for C$_{21}$H$_{26}$O$_4$ (342.42): C, 73.66; H, 7.66; found (approximately): C, 73.75; H, 7.61]. A solution of 10.3 mg. of the $\Delta^{4,7,9(11)}$-pregnatriene-17α,21-diol-3,20-dione in 1 ml. pyridine and 1 ml. acetic anhydride is allowed to stand at room temperature for 15 hours. The resulting mixture is evaporated to dryness in high vacuum, and the residue crystallized from acetone. The acetate has the following properties: M. P. about 200–202°;

$\lambda_{max}^{alc.}$ 243 m$\mu$ ($\epsilon$=21,900), shoulders at 237 m$\mu$ ($\epsilon$=20,300) and 250 m$\mu$ ($\epsilon$=18,000); $\lambda_{max}^{Nujol}$ 3.02$\mu$, 5.77$\mu$, 5.81$\mu$, 5.88$\mu$, 606$\mu$ 9α-bromo-$\Delta^4$-pregnene-11β,17α,21-triol-3,20-dione 21-acetate shows approximately ⅓ of the activity of cortisone acetate in the liver glycogen deposition assay according to Pabst, Sheppard and Kuizenga (Endocrinology, 41, 55 (1947)).

Like other 11β-hydroxy derivatives, 9α-bromo-$\Delta^4$-pregnene-11β,17α,21-triol-3,20-dione 21-acetate is recovered unchanged after treatment with pyridine and acetic anhydride at room temperature for 18 hours.

(e) 9α-bromocortisone acetate (XVI) from 9α-bromo-$\Delta^4$-pregnene-11β,17α,21-triol-3,20-dione 21-acetate (XV).—To a solution of 149 mg. 9α-bromo-$\Delta^4$-pregnene-11β,17α,21-triol-3,20-dione 21-acetate in 6 ml. glacial acetic acid is added at room temperature a solution of 40 mg. chromic acid in 4 ml. glacial acetic acid. The addition is made in four 1 ml. portions waiting each time until the color of the solution has changed from brown to green. After 70 minutes, the reaction is terminated by adding one ml. alcohol; and after an additional 10 minutes, the solution is evaporated to near-dryness. The residue is distributed between 5 ml. water and 20 ml. chloroform, and the resulting chloroform solution extracted with water, dilute sodium bicarbonate and again with water. After drying over sodium sulfate, the chloroform is removed in vacuo, and the residue (about 158 mg.) containing the 9α-bromocortisone acetate (XVI) is crystallized from methanol. A total of about 83 mg. of crystalline material is obtained, which after an additional crystallization has the following properties: M. P. about 220° (dec.); $[\alpha]_D^{23}$ +235° (c., .62 in CHCl$_3$);

$$\lambda_{max}^{alc.}\ 237\ m\mu\ (\epsilon=16,100)$$

An analytical sample dried at 100° in vacuo analyzes as follows [calculated for C$_{23}$H$_{29}$O$_6$Br: C, 57.41; H, 6.03; Br, 16.61; found (approximately): C, 57.30; H, 6.16; Br, 16.15].

9α-bromocortisone acetate shows approximately ½ the activity of cortisone acetate in the liver glycogen deposition assay.

EXAMPLE 2

*Preparation of 9α-bromo-11β-hydroxyprogesterone (XX)*

(a) *11α-tosyloxyprogesterone (IX) from 11α-hydroxyprogesterone (II).*—376 mg. 11α-hydroxyprogesterone is tosylated in 3 ml. anhydrous pyridine with 292 mg. p-toluenesulfonyl chloride, as described hereinbefore for epi-F (Example 1, section b). 442 mg. of crude tosylate is obtained, which after crystallization from absolute ethanol yields about 340 mg. of crystals. The pure 11α-tosyloxyprogesterone is obtained by an additional crystallization from ethanol, and has the following properties: M. P., about 154–157° (dec.); $[α]_D^{24}$ +121° (c., 0.97 in CHCl$_3$); and analysis [calculated for C$_{28}$H$_{36}$O$_5$S: C, 69.42; H, 7.43; S, 6.61; found (approximately): C, 69.23; H, 7.25; S, 6.61].

(b) *Δ$^{4,9(11)}$-pregnadiene-3,20-dione (XIII) from 11α-tosyloxyprogesterone (IX).*—84 mg. 11α-tosyloxyprogesterone is reacted with anhydrous sodium acetate (167 mg.) in glacial acetic acid (3 ml.) and the reaction mixture worked up as described hereinbefore (Example 1, section c). The resulting product about (51 mg.) cannot be purified solely by crystallization. It is therefore dissolved in 1 ml. benzene and 4 ml. hexane, and chromatographed on 1 g. sulfuric acid-washed alumina. A mixture of 1 part benzene and 4 parts hexane elutes about 39 mg. of Δ$^{4,9(11)}$-pregnadiene-3,20-dione, which after recrystallization from ether-hexane has the following properties: M. P., about 121–123°; $[α]_D^{23}$ +151° (c., 0.85 in acetone); +171° (c., 0.58 in CHCl$_3$). Analysis [calculated for C$_{21}$H$_{28}$O$_2$: C, 80.77; H, 8.98; found (approximately) C, 81.00, H, 8.84].

Shoppee and Reichstein (Helv. 24, 351 (1941)) have reported an M. P. of 122° and an $[α]_D$ +145° for this substance.

(a: *alternative*).—11α-hydroxyprogesterone may be converted into 11α-mesyloxyprogesterone by reaction with methanesulfonyl chloride as described in Example 10 hereinafter, and the latter converted to Δ$^{4,9(11)}$-pregnadiene-3,20-dione in the same manner as 11α-tosyloxyprogesterone.

(c) *9α-bromo-11β-hydroxyprogesterone (XX) from Δ$^{4,9(11)}$-pregnadiene-3,20-dione (XIII).*—508 mg. Δ$^{4,9(11)}$-pregnadiene-3,20-dione is reacted with 309 mg. N-bromoacetamide, and the reaction mixture is worked up as described in section d of Example 1. The resulting product (about 780 mg.) is recrystallized from acetone-hexane, and yields pure 9α-bromo-11β-hydroxyprogesterone having the following properties: M. P. about 148–150° (dec.); $[α]_D^{23}$ +187° (c., 1.0 in CHCl$_3$);

$λ_{max}^{alc.}$ 243 mμ (ε=16,100); $λ_{max}^{Nujol}$ 3.01μ, 5.90μ, 6.00μ, 6.07μ, 6.17μ

Analysis [calculated for C$_{21}$H$_{29}$O$_3$Br (409.4): C, 61.61; H, 7.14; found (approximately): C, 61.91; H, 6.92].

EXAMPLE 3

*Preparation of 9α-bromocorticosterone acetate (XVII)*

(a) *Epicorticosterone 21-acetate (VI) from epicorticosterone (III).*—347 mg. of epicorticosterone is acetylated in 4 ml. anhydrous pyridine with 0.1035 ml. acetic anhydride at 0° for 18 hours. The practically pure, amorphous epicorticosterone acetate (about 400 mg.) is isolated essentially as described hereinbefore (Example 1, section a).

(b) *Epicorticosterone 21-acetate 11α-tosylate (X) from epicorticosterone 21-acetate (VI).*—400 mg. of the amorphous epicorticosterone 21-acetate obtained in a is treated with 400 mg. p-toluenesulfonyl chloride in 5 ml. pyridine, the reaction mixture worked up as described hereinbefore for the steps IV–VII (Example 1, section b). The resulting tosylate (about 492 mg.) cannot be obtained in crystalline form. It is therefore subjected to the next step without further purification.

(c) *Δ$^{4,9(11)}$-pregnadiene-21-ol-3,20 - dione 21 - acetate (XIV) from epicorticosterone 21-acetate 11α-tosylate (X).*—492 mg. of epicorticosterone 21-acetate 11α-tosylate as obtained in b is treated with 986 mg. anhydrous sodium acetate in 9 ml. glacial acetic acid and the reaction mixture worked up as described hereinbefore (Example 1, section c). The residue (about 390 mg.) crystallizes readily from acetone, and after another crystallization from that solvent yields about 100 mg. of pure Δ$^{4,9(11)}$-pregnadiene-21-ol-3,20-dione acetate having the following properties: M. P., about 158.5–159.5°; $[α]_D^{23}$ +128° (c., 0.98 in acetone) and +150° (c., 1.13 in CHCl$_3$); analysis [calculated for C$_{23}$H$_{30}$O$_4$: C, 74.56; H, 8.16; found (approximately): C, 74.79; H, 8.11].

Shoppee and Reichstein (Helv., 26, 1316 (1943)) report M. P. 159° and $[α]_D^{18}$ +129° (acetone) for the compound.

An additional amount of pure product is obtained by chromatographing the mother liquors from benzene (5 ml.) on alumina 5 g. and eluting the Δ$^{4,9(11)}$-pregnadiene-21-ol-3,20-dione acetate with benzene.

(d) *9α - bromocorticosterone acetate (XVII) from Δ$^{4,9(11)}$ - pregnadiene-21-ol-3,20-dione acetate (XIV).*—72 mg. of Δ$^{4,9(11)}$-pregnadiene-21-ol-3,20-dione acetate is treated with 38 mg. of N-bromacetamide and the reaction mixture worked up as described hereinbefore (Example 1, section d). The resulting crude product (about 96 mg.) is recrystallized from acetone-hexane and yields pure 9α-bromocorticosterone acetate (XVII) having the following properties: M. P., about 152–3° (dec.); $[α]_D^{23}$ +178° (c., 0.94 in CHCl$_3$); and analysis [calculated for C$_{23}$H$_{31}$O$_5$Br: C, 59.10; H, 6.68; Br, 17.10; found (approximately): C, 59.16; H, 6.70; Br, 17.03].

EXAMPLE 4

*Preparation of Δ$^4$-pregnene-9β,11β-oxido-17α,21-diol-3,20-dione (XIX) or its 21-acetate (XXI)*

(a) *Δ$^4$-pregnene-9β,11β-oxido-17α,21-diol-3,20-dione (XIX) from 9α-bromo-Δ$^4$-pregnene-11β,17α,21-triol-3,20-dione 21-acetate (XV).*—To a solution of 115 mg. 9α-bromo-Δ$^4$-pregnene-11β,17α,21-triol-3,20-dione 21-acetate in 10 ml. methanol is added a solution of 103 mg. potassium bicarbonate in 1 ml. water. The resulting solution is allowed to remain at room temperature for 18 hours, after which time 4 ml. water is added, and the solution is freed from methanol in vacuo. Chloroform is added to the residue, and after mixing and separation of the layers, the chloroform solution is washed with water and dried over sodium sulfate. Evaporation of the solvent leaves a residue (about 82 mg.) which crystallizes readily from acetone. The pure Δ$^4$-pregnene-9β,11β-oxido-17α,21-diol-3,20-dione has the following properties: M. P., about 206–208°; $[α]_D^{22}$ +23° (c., 0.75 in CHCl$_3$), $λ_{max}^{alc.}$ 243 mμ (ε=13,700)

analysis [calculated for C$_{21}$H$_{28}$O$_5$: C, 70.02; H, 7.77; found (approximately) C, 70.39; H, 7.95].

(a: *alternative*) *Δ$^4$-pregnene - 9β,11β - oxido-17α,21-diol-3,20-dione 21-acetate (XXI) from 9α-bromo-Δ$^4$-pregnene-11β,17α,21-triol-3,20-dione 21-acetate (XV).*—A solution of 2.5 g. 9α-bromo-Δ$^4$-pregnene-11β,17α,21-triol-3,20-dione 21-acetate (cf. section d of Example 1) and 6.25 g. potassium acetate in 190 absolute alcohol is refluxed for 50 min. After the addition of 20 ml. water, the solution is concentrated in vacuo to incipient crystallization. Water is again added (50 ml.) and the crystallization is completed in the refrigerator. The first crop (about 1.31 g.) melts at about 209.5–10.5°; and a second crop (about 291 mg.), melting at about 206–208°, is obtained on concentration of the mother liquors. The analytically pure material obtained by crystallization from acetone melts at about 210–212° and has $[\alpha]_D^{23}$ +41° (c., 0.70 in CHCl₃);

$$\lambda_{max.}^{alc.} \ 243 \ m\mu \ (\epsilon = 15,500)$$

Its approximate analysis (calculated for $C_{23}H_{30}O_6$: C, 68.63; H, 7.51): C, 69.02; H, 7.42.

The 9β,11β-oxido steroids of the pregnane series (e. g. XXI) are very reactive (unlike the corresponding α-oxido compounds) and react easily with agents known to open oxido rings under mild conditions. Thus, the ring can be split, inter alia, by hydrobromic acid to obtain the corresponding 9α-bromo-11β-hydroxy compound (XV), by hydriodic acid to obtain the corresponding 9α-iodo 11β-hydroxy compound (XXII), by hydrochloric acid to obtain the corresponding 9α-chloro 11β-hydroxy compound (XXIII), and by hydrofluoric acid to obtain the corresponding 9α - fluoro 11β - hydroxy compound (XXXVI), the reaction being preferably effected in an alcohol-free solvent. The following is a schematic representation of some of these conversions:

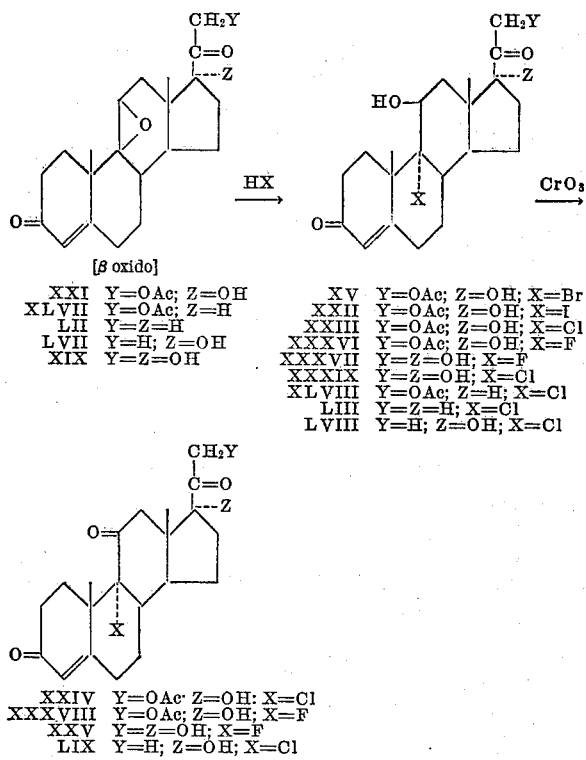

| [β oxido] | |
|---|---|
| XXI Y=OAc; Z=OH | XV Y=OAc; Z=OH; X=Br |
| XLVII Y=OAc; Z=H | XXII Y=OAc; Z=OH; X=I |
| LII Y=Z=H | XXIII Y=OAc; Z=OH; X=Cl |
| LVII Y=H; Z=OH | XXXVI Y=OAc; Z=OH; X=F |
| XIX Y=Z=OH | XXXVII Y=Z=OH; X=F |
|  | XXXIX Y=Z=OH; X=Cl |
|  | XLVIII Y=OAc; Z=H; X=Cl |
|  | LIII Y=Z=H; X=Cl |
|  | LVIII Y=H; Z=OH; X=Cl |

XXIV Y=OAc; Z=OH; X=Cl
XXXVIII Y=OAc; Z=OH; X=F
XXV Y=Z=OH; X=F
LIX Y=H; Z=OH; X=Cl

EXAMPLE 5

*Preparation of 9α-bromo-Δ⁴-pregnene - 11β,17α,21 - triol-3,20-dione 21-acetate (XV)*

To a solution of 25 mg. Δ⁴-pregnene-9β,11β-oxido-17α, 21-diol-3,20-dione acetate (XXI) in 0.5 ml. glacial acetic acid and 0.5 ml. carbon tetrachloride is added at room temperature 0.04 ml. 30% hydrobromic acid in glacial acetic acid. After 10 minutes, 10 ml. chloroform is added, and the mixture is extracted with dilute sodium bicarbonate and with water. The chloroform solution is dried over sodium sulfate, evaporated to dryness in vacuo and the residue (weighing about 33.5 mg.) is crystallized from acetone. 9α-bromo-Δ⁴-pregnene-11β,17α, 21-triol-3,20-dione 21-acetate is obtained in a yield of about 29 mg., melting at about 126–128° (dec.) and $[\alpha]_D^{22}$ +140° (c., 0.98 in CHCl₃).

EXAMPLE 6

*Preparation of 9α-iodo-Δ⁴-pregnene-11β,17α,21-triol-3,20-dione 21-acetate (XXII)*

A solution of 204 mg. Δ⁴-pregnene-9β,11β-oxido-17α,21-diol-3,20-dione acetate (XXI) in 20 ml. chloroform is cooled to −20° in an ice-salt bath, and 0.4 ml. freshly distilled 55% aqueous hydriodic acid is added. The mixture is agitated thoroughly for 20 minutes, after which water is added and the layers are separated. The chloroform solution is washed with dilute sodium bicarbonate, dilute sodium sulfite and water, and finally dried over sodium sulfate. Evaporation of the solvent in vacuo leaves about 279 mg. of a crystalline residue, which is recrystallized from ethyl acetate, taking care to keep the temperature below 40°. The pure 9α-iodo-Δ⁴-pregnene-11β,17α,21-triol-3,20-dione 21-acetate obtained starts browning at about 80°, sinters at about 100° and decomposes at about 110°, and has $[\alpha]_D^{23}$ +140° (c., 0.53 in CHCl₃);

$$\lambda_{max.}^{alc.} \ 243 \ m\mu \ (\epsilon = 11,000)$$

Its approximate analysis (calculated for $C_{23}H_{31}O_6I$: C, 52.08; H, 5.89; I, 23.93): C, 52.54; H, 6.44; I, 22.60.

9α-iodo-Δ⁴-pregnene-11β,17α,21-triol-3,20-dione 21-acetate possesses about one-tenth the activity of cortisone acetate in the liver glycogen test.

Following the procedure of section e of Example 1, but using 9α-iodo-Δ⁴-pregnene-11β,17α,21-triol-3,20-dione 21-acetate, there is obtained the compound 9α-iodo-cortisone acetate.

EXAMPLE 7

*Preparation of 9α-chloro-Δ⁴-pregnene-11β,17α,21-triol-3,20-dione 21-acetate (XXIII)*

To a solution of 102 mg. of Δ⁴-pregnene-9β,11β-oxido-17α,21-diol-3,20-dione 21-acetate in 10 ml. alcohol-free chloroform is added, at 0°, 1.5 ml. of 0.5 N hydrochloric acid in chloroform (3 mole equivalents). After 60 minutes, ice and dilute bicarbonate are added to wash out excess acid; and after separation of the layers, the chloroform solution is washed with water, dried over sodium sulfate and evaporated to dryness. The crystalline residue, which weighs about 110° mg., is recrystallized twice from acetone. The properties of the pure 9α-chloro-Δ⁴-pregnene-11β,17α,21-triol-3,20-dione 21-acetate are as follows: M. P. about 201–202°; $[\alpha]_D^{23}$ +139° (c., 0.86 in CHCl₃);

$$\lambda_{max.}^{alc.} \ 241 m\mu \ (\epsilon = 15,800)$$

and approximate analysis (calculated for $C_{23}H_{31}O_6Cl$: C, 62.93; H, 7.12; Cl, 8.07): C, 63.23; H, 7.41; Cl, 7.70.

9α-chloro-Δ⁴-pregnene-11β,17α,21-triol-3,20-dione 21-acetate is about ⅘ times as active as cortisone acetate in the rat liver glycogen assay, and about 10–15 times as active as desoxycorticosterone acetate in causing sodium retention in the rat.

Following the procedure of section e of Example 1 but using 9α-chloro-17α-hydroxycorticosterone 21-acetate there is obtained 9α-chlorocortisone acetate (XXIV), having the following properties: M. P. 257–258 (dec.); $[\alpha]_D^{22}$ +252° (c., 1.1 in chloroform);

$$\lambda_{max.}^{alc.} \ 236 \ m\mu \ (\epsilon = 16,600)$$

and approximate analysis (calculated for $C_{23}H_{29}O_6Cl$: C, 63.22; H, 6.54; Cl, 8.11): C, 62.97; H, 6.61; Cl, 8.13.

9α-chlorocortisone acetate is about 4 times as active in the rat liver glycogen assay as cortisone acetate.

EXAMPLE 8

*Preparation of cortisone acetate*

To a solution of 25 mg. 9α-bromocortisone acetate (XVI) in 2 ml. glacial acetic acid is added at steam bath temperature with swirling a total of 48 mg. zinc dust. Additions are made portion-wise, and the reaction is interrupted after 15 minutes on the steam bath. The residual zinc is removed by centrifugation, and the acetic acid solution is evaporated to dryness in vacuo. The residue is taken up in 4 ml. water and 20 ml. chloroform; after separation of the layers, the chloroform solution is washed with water, dilute sodium bicarbonate and again with water; and after drying over sodium sulfate the solution is evaporated to dryness. The residue (about 23 mg.), after two crystallizations from acetone, yields crystals melting at about 238–241° (opaque at about 85°), which do not depress the melting point of authentic cortisone acetate. The infrared spectrum of this product is identical with that of cortisone acetate.

EXAMPLE 9

*Preparation of 17α-hydroxycorticosterone acetate (XXVII)*

A solution of 100 mg. 9α-bromo-$\Delta^4$-pregnene-11β,17α,21-triol-3,20-dione 21-acetate (XV) in 30 ml. alcohol and 5 ml. water is shaken with 1.0 g. zinc dust at room temperature (23°) for 19 hours. At the end of this period the zinc dust is removed by centrifugation and washed with alcohol. The alcoholic solution is concentrated in vacuo until most of the alcohol has evaporated, and the remaining aqueous suspension is extracted with chloroform. The chloroform extract is dried over sodium sulfate and evaporated to dryness in vacuo. The residue (weighing about 84 mg.) is dissolved in 1 ml. chloroform and 4 ml. benzene, and chromatographed on 2 g. silica gel (Davison No. 923). Elution of the column with chloroform-benzene (1:1) yields $\Delta^{4,9(11)}$-pregnadiene-17α,21-diol-3,20-dione 21-acetate, melting at about 233–235°, identified by infra-red comparison with an authentic sample, followed by lower melting mixed fractions. Elution with 250 ml. chloroform yields about 25 mg. 17α-hydroxycorticosterone acetate, which after recrystallization from acetone melts at about 216–218.5° and has $[\alpha]_D^{23}$ +156° (c., 0.36 in $CHCl_3$);

$$\lambda_{max.}^{alc.} \ 241 \ m\mu \ (\epsilon = 16{,}700)$$

Its approximate analysis (calculated for $C_{23}H_{32}O_6$: C, 68.29; H, 7.97): C, 68.47; H, 8.14.

An authentic sample of 17α-hydroxycorticosterone melted at 218–220°, had $[\alpha]_D^{23}$ +157° (c., 0.37 in $CHCl_3$) and had an infrared spectrum identical in all respects with that of the above sample.

Reduction of 9α-iodo-$\Delta^4$-pregnene-11β,17α,21-triol-3,20-dione 21-acetate (XXII) with zinc dust in dilute alcohol under the above conditions yields 17α-hydroxycorticosterone acetate in approximately the same yield.

EXAMPLE 10

*$\Delta^4$-pregnene-11α,17α,21-triol-3,20-dione 11α-mesylate 21-acetate (XXX) from $\Delta^4$-pregnene-11α,17α,21-triol-3,20-dione 21-acetate (IV)*

264 g. of the amorphous residue of $\Delta^4$-pregnene-11α,17α,21-triol-3,20-dione 21-acetate (IV), obtained in section *a* of Example 1, is dissolved in 1050 ml. chloroform and 255 ml. pyridine, and to the resulting solution immersed in an ice bath is added over a twenty-minute period a solution of 80 ml. pure methanesulfonyl chloride in 250 ml. chloroform. The resulting mixture is allowed to remain in the refrigerator for sixteen hours, after which time about 10 g. of ice is added. After an additional one-half hour at 0°, the mixture is washed with water, and then with 1 N HCl until the last traces of pyridine are removed, and again with water; and this is followed by a dilute sodium bicarbonate wash and a third water wash. The chloroform solution is dried over sodium sulfate, and concentrated to approximately 200 ml. Upon addition of 1 liter absolute ethanol, crystallization ensues rapidly, and is allowed to go to completion in the refrigerator. Filtration produces a first crop of crystals (about 244 g.), and concentration of the mother liquors in vacuo gives a second crop (about 41 g.). The material obtained in this manner melts at 157–158°. An additional recrystallization affords analytically pure material having the following properties: M. P. about 159–160°, with browning; $[\alpha]_D^{23}$ +119° (c., 1.09 in $CHCl_3$); analysis [calculated for $C_{24}H_{34}O_8S$ (482.56): C, 59.73; H, 7.10; S, 6.64; found (approximately): C, 59.47; H, 7.13; S, 6.36]. This material can be converted into $\Delta^{4,9(11)}$-pregnadiene-17α,21-diol-3,20-dione 21-acetate (XI) as described in section *c* of Example 1, and the latter further treated as described in Example 1, sections *c*: alternative and *d* et seq.

EXAMPLE 11

*$\Delta^{4,9(11)}$-pregnadiene-17α,21-diol-3,20-dione (XII) from $\Delta^4$-pregnene-11α,17α,21-triol-3,20-dione 11α-tosylate 21-acetate (VII)*

A solution containing 303 mg. $\Delta^4$-pregnene-11α,17α-21-triol-3,20-dione 11α-tosylate 21-acetate and 40 mg. of toluenesulfonic acid monohydrate in 25 ml. absolute methanol is refluxed for six hours. After the addition of 10 ml. of water, the mixture is concentrated in vacuo, and the residual aqueous suspension extracted with chloroform. The chloroform extract is washed with dilute sodium bicarbonate solution and with water, and dried over sodium sulfate. Crystallization of the resulting residue (about 22 mg.) from acetone and finally from 95% ethanol yields $\Delta^{4,9(11)}$-pregnadiene-17α,21-diol-3,20-dione, melting at about 244–247° (cf. section *c*: alternative, Example 1).

EXAMPLE 12

*$\Delta^4$-pregnene-11α,17α,21-triol-3,20-dione 11α,21-dimesylate (XXXI) from epi-F (I)*

To a solution of 10 g. epi-F (I) in 110 ml. anhydrous pyridine is added at 0° a solution of 6.6 ml. methanesulfonyl chloride in 10 ml. chloroform. The reaction mixture is allowed to remain at 0° for fifteen hours, after which 1 g. of ice is added. After an additional one-half hour at 0°, the mixture is concentrated in vacuo to a small volume. The resulting residue is taken up in chloroform and water, and the chloroform solution is washed with cold dilute hydrochloric acid, dilute sodium bicarbonate solution, and finally with water. The chloroform solution is then dried over sodium sulfate and evaporated to dryness in vacuo. The crystalline residue (about 12.4 g.) is recrystallized from 95% ethanol, yielding the analytically pure dimesylate, having the following properties: M. P. about 162° (dec.); $[\alpha]_D^{23}$ +97° (c., 0.98 in dioxane); analysis [calculated for $C_{23}H_{34}O_9S_2$ (502.62): C, 53.26; H, 6.60; S, 12.36; found (approximately): C, 53.42; H, 6.29; S, 11.00]. The dimesylate can be converted into $\Delta^{4,9(11)}$-pregnadiene-17α,21-diol-3,20-dione 21-acetate (XI) according to the procedure described in section *c* of Example 1.

EXAMPLE 13

*Preparation of 9α-fluorocortisone acetate (XXXVIII)*

(a) *9α-fluorohydrocortisone acetate (XXXVI) from $\Delta^4$-pregnene-9β,11β-oxido-17α,21-diol-3,20-dione 21-acetate (XXI)*.—Anhydrous hydrogen fluoride is added to a solution of 15 g. $\Delta^4$-pregnene-9β,11β-oxido-17α,21-diol-3,20-dione 21-acetate in 300 ml. chloroform (contained in a polyethylene vessel provided with a copper inlet tube). During the addition the solution is maintained in an ice bath and agitated by magnetic stirring, until the solution assumes a prominent red color. The inlet tube is then replaced by a (polyethylene) cap, and the reaction is allowed to proceed with stirring for four one-half hours at 0°. Concentrated aqueous sodium bicarbonate solution is then added until the mixture is slightly alkaline, and the two layers are separated. The now light-yellow chloroform solution is washed with water; and after drying over sodium sulfate, it is evaporated to dryness in vacuo. The residue (about 17.9 g.) is then taken up in 125 ml. hot ethyl acetate, the resulting suspension filtered, and the precipitate (on the filter) and the filtrate treated as described hereinafter.

The ethyl acetate filtrate, on cooling, deposits a crystalline precipitate consisting of long needles intermixed with small heavy prisms. This material (about 6.2 g.) melts at about 228–230°, and is essentially pure 9α-fluorohydrocortisone acetate. For analysis, it is recrystallized from ethyl acetate, and then melts at about 233–234°. [Occasionally samples are obtained which soften at about 205–208°, resolidify, and eventually melt at about 226–228°, probably due to polymorphism.] It has the following properties: $[\alpha]_D^{23}$ +123° (c., 0.64 in $CHCl_3$);

$\lambda_{max}^{alc.}$ 238 mµ ($\epsilon$=16,800); $\lambda_{max}^{Nujol}$ 2.86µ, 3.01µ, 5.62µ, 5.78µ, 5.83µ, 6.05µ analysis [calculated for $C_{23}H_{31}O_6F$ (422): C, 65.39; H, 7.39; F, 4.52; found (approximately): C, 65.32; H, 7.26; F, 4.50].

Fractionation of the ethyl-acetate mother liquor furnishes an additional amount of 9α-fluorohydrocortisone acetate, raising the yield to a total of 50%.

9α-fluorohydrocortisone acetate is about 11 times as active as cortisone acetate in the rat liver glycogen assay and about 1–2 times as active as desoxycorticosterone acetate in causing sodium retention in the rat.

The ethyl acetate-insoluble material on the filter (about 1.35 g.) is recrystallized from acetone. The pure compound has the following properties: M. P. about 259–262°, with browning; $[\alpha]_D^{23}$ +262° (c., 0.53 in 95% ethanol);

$\lambda_{max}^{alc.}$ 239 mµ ($\epsilon$=18,000); $\lambda_{max}^{Nujol}$ 2.94µ, 3.03µ, 5.75µ, 5.82µ, 6.07µ, 6.11µ analysis [calculated for $C_{23}H_{30}O_6$ (402): C, 68.63; H, 7.51; found (approximately); C, 68.45; H, 7.17].

(b) *9α-fluorohydrocortisone (XXXVII) from 9α-fluorohydrocortisone acetate (XXXVI)*.—To a solution of 103.8 mg. 9α-fluorohydrocortisone acetate in 10 ml. absolute methanol is added under nitrogen a solution of 11.4 mg. sodium in 1.9 ml. anhydrous methanol. The mixture is allowed to stand at room temperature for 30 minutes and acidified by addition of a few drops of glacial acetic acid. Water is then added; and after removal of the methanol in vacuo, the 9α-fluorohydrocortisone is extracted with ethyl acetate. The extract is washed with sodium bicarbonate solution and with water, and dried over sodium sulfate. Evaporation of the solvent leaves a crystalline residue (about 92 mg.), which after recrystallization from 95% alcohol has the following properties: M. P. about 260–262° (dec.); $[\alpha]_D^{23}$ +139° (c., 0.55 in 95% alcohol);

$\lambda_{max}^{alc.}$ 239 mµ ($\epsilon$=17,600); $\lambda_{max}^{Nujol}$ 3.01µ, 5.84µ, 6.07µ, 6.20µ analysis [calculated for $C_{21}H_{29}O_5F$ (380.4): C, 66.30; H, 7.68; found (approximately): C, 66.49; H, 8.22].

9α-fluorohydrocortisone has approximately the same biological activity as its acetate.

(c) *9α-fluorocortisone acetate (XXXVIII) from 9α-fluorohydrocortisone acetate (XXXVI)*.—To a solution of 31.2 mg. 9α-fluorohydrocortisone acetate in 3 ml. glacial acetic acid is added a solution of 10 mg. chromic acid in 2 ml. acetic acid. A half-hour later, 1 ml. of methanol is added, and the resulting mixture is concentrated in vacuo. The residue is distributed between chloroform and water, and the resulting chloroform extract is washed with water, sodium bicarbonate solution and again with water. After drying over sodium sulfate and evaporation of the solvent in vacuo, the residue (about 25 mg.) is crystallized from 95% alcohol. The pure 9α-fluorocortisone acetate has the following properties: M. P. about 254–255°, $[\alpha]_D^{23}$ +155° (c., 0.45 in $CHCl_3$);

$\lambda_{max}^{alc.}$ 234 mµ ($\epsilon$=17,000); $\lambda_{max}^{Nujol}$ 2.86µ, 5.72µ, 5.78µ, 5.83µ, 6.05µ analysis [calculated for $C_{23}H_{29}O_6F$: C, 65.70; H, 6.95; found (approximately): c., 65.62; H, 7.19].

9α-fluorocortisone acetate is about 10 times as active as cortisone acetate in the rat liver glycogen assay.

(d) *9α-fluorocortisone (XXV) from 9α-fluorocortisone acetate (XXXVIII)*.—25 mg. 9α-fluorocortisone acetate is deacetylated as described in section *b* of Example 13. About 18.4 mg. of the product is obtained, which on crystallization from 95% alcohol, yields about 14 mg. 9α-fluorocortisone having the following properties: M. P. about 261–262°; $[\alpha]_D^{23}$ +144° (c., 0.41 in $CHCl_3$);

$\lambda_{max}^{alc.}$ 234 mµ ($\epsilon$=16,000); $\lambda_{max}^{Nujol}$ 2.88µ, 5.87µ, 608µ analysis [calculated for $C_{21}H_{27}O_5F$: C, 66.65; H, 7.19; found: C, 66.50; H, 6.98].

EXAMPLE 14

*9α-chlorohydrocortisone (XXXIX) from Δ⁴-pregnene-9β,11β-oxido-17α,21-diol-3,20-dione (XIX)*

To a solution of 30.8 mg. Δ⁴-pregnene-9β,11β-oxido-17α,21-diol-3,20-dione in 5 ml. chloroform is added, at 0°, 0.55 ml. 0.45 N HCl in chloroform. The mixture is allowed to remain at 0° for one hour, during which period crystals begin to deposit, and is then treated with sodium bicarbonate solution until slightly alkaline; and ethyl acetate is added to dissolve the deposited 9α-chlorohydrocortisone. The layers are separated, and the organic phase washed with water and dried over sodium sulfate. Evaporation of the solvents leaves a crystalline residue, which after recrystallization from 95% alcohol gives 9α-chlorohydrocortisone having the following properties: M. P. about 203° (dec.); $[\alpha]_D^{23}$ +155° (c., 0.58 in 95% alcohol);

$\lambda_{max}^{alc.}$ 241 mµ ($\epsilon$=17,000); $\lambda_{max}^{Nujol}$ 2.94µ, 3.03µ, 5.87µ, 6.15µ analysis [calculated for $C_{21}H_{29}O_5Cl$: C, 63.56; H, 7.36; found (approximately): C, 63.42; H, 7.22].

9α-chlorohydrocortisone has approximately the same biological activity as its acetate. Use of hydrobromic or hydriodic acid in place of hydrochloric acid in the foregoing procedure yields 9α-bromohydrocortisone and 9α-iodohydrocortisone, respectively.

EXAMPLE 15

*Preparation of 9α-bromo-11-dehydrocorticosterone acetate (XLVI)*

(a) *Epi - corticosterone 11α - mesylate 21 - acetate (XXXV) from epicorticosterone 21-acetate (VI)*.—To a solution of 3.27 g. epi-corticosterone 21-acetate, obtained as described in section *a* of Example 3, in 40 ml. pyridine is added at 0° a solution of 0.953 ml. of methanesulfonyl chloride in 7 ml. chloroform. After the reaction mixture has stood in the refrigerator for 17 hours, a few small pieces of ice are added, and the mixture is allowed to remain at 0° for an additional half hour. The mixture is then concentrated to small volume in vacuo, taken up with chloroform and the chloroform solution extracted with dilute acid, sodium bicarbonate solution and finally with water. The chloroform solution is then dried over sodium sulfate and evaporated to dryness in vacuo. A residue of about 3.73 g. results, which crystallizes from absolute ethanol. Pure epi-corticosterone 11α-mesylate 21-acetate has the following properties: M. P. about 156–157° (dec.); $[\alpha]_D^{23}$ +144° (c., 0.92 in $CHCl_3$); analysis [calculated for $C_{24}H_{34}O_6S$ (466.57): C, 61.78; H, 7.34; found (approximately): C, 62.52; H, 7.07].

(b) *Δ⁴,⁹⁽¹¹⁾-pregnadiene-21-ol-3,20-dione 21 - acetate (XIV) from epi-corticosterone 11α-mesylate 21-acetate (XXXV)*.—A solution of 1.92 g. epi-corticosterone 11α-mesylate 21-acetate and 3.84 g. anhydrous sodium acetate in 40 ml. glacial acetic acid is refluxed for one hour. The reaction mixture is worked up as described in section *c* of Example 3. Crystallization of the resulting residue (about 1.66 g.) from acetone affords Δ⁴,⁹⁽¹¹⁾-pregnadiene-21-ol-3,20-dione 21-acetate in 84% yield.

(c) *9α - bromocorticosterone acetate (XVII) from Δ⁴,⁹⁽¹¹⁾ - pregnadiene - 21 - ol - 3,20 - dione 21 - acetate (XIV)*.—Same as section *d* of Example 3.

(d) *9α-bromo-11-dehydrocorticosterone acetate (XLVI) from 9α-bromocorticosterone acetate (XVII)*.—A solution of 105 mg. 9α-bromocorticosterone acetate in 6 ml. glacial acetic acid is oxidized with a solution of 26 mg.

chromium trioxide in 5 ml. glacial acetic acid. After 40 minutes, 1 ml. alcohol is added and the reaction mixture is worked up as described in section *c* of Example 13. A chloroform residue results, which weighs about 101 mg. Crystallization of this residue from acetone-hexane affords about 82 mg. 9α-bromo-11-dehydrocorticosterone acetate, which after an additional recrystallization from the same solvent is obtained in an analytically pure form having the following properties: M. P. about 183–184° (dec.); $[\alpha]_D^{23}$ +275° (c., 0.99 in $CHCl_3$);

$\lambda_{max}^{alc.}$ 237 m$\mu$ ($\epsilon$ = 16,400); $\lambda_{max}^{Nujol}$ 5.76$\mu$, 5.85$\mu$, 6.00$\mu$, 6.18$\mu$ Analysis [calculated for $C_{23}H_{29}O_5Br$ (465.37): C, 59.36; H, 6.28; found (approximately): C, 59.26; H, 6.03].

EXAMPLE 16

*Preparation of 9α-chlorocorticosterone acetate (XLVIII)*

(a) *Δ⁴-pregnene-9β,11β-oxido-21-ol-3,20-dione 21-acetate (XLVII) from 9α-bromocorticosterone acetate (XVII).*—A solution of 253.8 mg. 9α-bromocorticosterone acetate (cf. section *d* of Example 3) and 625 mg. anhydrous potassium acetate in 18 ml. absolute alcohol is refluxed for 50 minutes. After the addition of 10 ml. water, the alcohol is evaporated in vacuo, and the residual aqueous suspension extracted with chloroform. The chloroform solution is washed with water, dried over sodium sulfate, and evaporated to dryness in vacuo. The residue (about 205 mg.) does not crystallize, and is utilized in the following step without further purification.

(b) *9α-chlorocorticosterone acetate (XLVIII) from Δ⁴-pregnene-9β,11β-oxido-21-ol-3,20-dione 21-acetate (XLVII).*—To an ice-cooled solution of 100.9 mg. Δ⁴-pregnene-9β,11β-oxido-21-ol-3,20-dione 21-acetate in 10 ml. chloroform is added 1.6 ml. 0.49 N HCl in chloroform. After one hour at 0°, more chloroform is added, and the solution is extracted with sodium bicarbonate solution and water, and finally dried over sodium sulfate. Evaporation of the solvent leaves a residue (about 124 mg.) which crystallizes readily from acetone-hexane. The pure 9α-chlorocorticosterone acetate has the following properties: M. P. about 192° (dec.); $[\alpha]_D^{23}$ +191° (c., 0.67 $CHCl_3$);

$\lambda_{max}^{alc.}$ 240 m$\mu$ ($\epsilon$ = 18,800); $\lambda_{max}^{Nujol}$ 2.87$\mu$, 3.01$\mu$, 5.70$\mu$, 5.77$\mu$, 5.83$\mu$, 5.99$\mu$, 6.08$\mu$ analysis [calculated for $C_{23}H_{31}O_5Cl$ (422.9): C, 65.31; H, 7.38; found (approximately): C, 65.52; H, 7.24].

9α-chlorocorticosterone acetate has activity equal to that of cortisone acetate in the rat liver glycogen assay.

Following the foregoing procedure (section *b*) but using hydrogen fluoride or hydriodic acid in place of hydrochloric acid, there is obtained 9α-fluorocorticosterone acetate and 9α-iodocorticosterone acetate, respectively the former having the following properties: M. P. about 212–214° C., $[\alpha]_D^{23}$ +184° (c., 0.11 in chloroform); activity, four times that of cortisone acetate in lever glycogen assay, and more than ten times that of desoxycorticosterone acetate in sodium retention assay. Following the procedure of section *d* of Example 15, but substituting 9α-fluorocorticosterone acetate, 9α-chlorocorticosterone acetate, and 9α-iodocorticosterone acetate for the 9α-bromocorticosterone acetate, there are obtained, respectively, 9α-fluoro-11-dehydrocorticosterone acetate, 9α-chloro-11-dehydrocorticosterone acetate, and 9α-iodo-11-dehydrocorticosterone acetate, respectively.

EXAMPLE 17

(a) *9α-bromo-11-ketoprogesterone (XLIX) from 9α-bromo-11β-hydroxyprogesterone (XX).*—100 mg. 9α-bromo-11β-hydroxyprogesterone (cf. Example 2) is oxidized with 29 mg. chromic acid as described in section *e* of Example 1. The resulting crude product (about 98.1 mg.) is recrystallized from acetone, and yields pure 9-bromo-11-ketoprogesterone having the following properties: M. P. about 165–167° (dec.); $[\alpha]_D^{23}$ +309° (c., 1.0 in $CHCl_3$);

$\lambda_{max}^{alc.}$ 237 m$\mu$ ($\epsilon$ = 16,700); $\lambda_{max}^{Nujol}$ 5.87$\mu$, 6.00$\mu$, 6.17$\mu$ analysis [calculated for $C_{21}H_{27}O_3Br$ (407.43): C, 61.92; H, 6.68; found (approximately): C, 61.80; H, 6.46].

(b) *11-ketoprogesterone from 9α-bromo-11-ketoprogesterone (XLIX).*—To a solution of 12 mg. 9α-bromo-11-ketoprogesterone in 1.5 ml. acetone is added, under a blanket of carbon dioxide, 0.3 ml. of a solution of chromous chloride (prepared as described in the Journal of the American Chemical Society, 72, 4080 (1950). The reaction mixture is allowed to remain at room temperature for 20 minutes, after which time 5 ml. water is added, and the acetone removed in vacuo. The residual aqueous suspension is extracted with chloroform, the chloroform solution washed with water, sodium bicarbonate solution, and again with water, and dried over sodium sulfate. Evaporation of the solvent in vacuo leaves a residue (about 12.8 mg.), which on crystallization from acetone-hexane yields pure 11-ketoprogesterone melting at about 171–172° and possessing an infrared spectrum identical with that of authentic 11-ketoprogesterone. A mixture M. P. with an authentic sample shows no depression.

EXAMPLE 18

*Preparation of 9α-chloro-11β-hydroxyprogesterone (LIII)*

(a) *9β,11β-oxidoprogesterone (LII) from 9α-bromo-11β-hydroxyprogesterone (XX).*—103 mg. 9α-bromo-11β-hydroxyprogesterone is treated with 250 mg. potassium acetate as described in section *a*: alternative of Example 4. The resulting amorphous product, representing 9β,11β-oxidoprogesterone (about 90.6 mg.), cannot be crystallized even after chromatography, and is therefore used for the next step without further purification.

(b) *9α-chloro-11β-hydroxyprogesterone (LIII) from 9β,11β-oxidoprogesterone (LII).*—63.2 mg. 9β,11β-oxidoprogesterone in 6.3 m. chloroform is reacted with 1.2 ml. 0.488 N HCl acid in chloroform at 0° for one hour. The reaction mixture is worked up as described in Example 7, and the resulting residue (about 72 mg.) is crystallized from acetone-hexane. Pure 9α-chloro-11β-hydroxyprogesterone is obtained after an additional recrystallization from absolute ethanol, and has the following properties: M. P. about 204° (dec.); $[\alpha]_D^{23}$ +199° (c., 0.47 in $CHCl_3$);

$\lambda_{max}^{alc.}$ 240 m$\mu$ ($\epsilon$ = 18,600); $\lambda_{max}^{Nujol}$ 2.96$\mu$, 5.90$\mu$, 6.00$\mu$, 6.07$\mu$ analysis [calculated for $C_{21}H_{29}O_3Cl$ (364.89): C, 69.13; H, 8.01; found (approximately): C, 69.00; H, 7.73].

9α-chloro-11β-hydroxyprogesterone has ¼ the activity of cortisone acetate in the rat liver glycogen assay.

Following the foregoing procedure but using hydrogen fluoride or hydriodic acid in place of hydrochloric acid, there is obtained 9α-fluoro-11β-hydroxyprogesterone and 9α-iodo-11β-hydroxyprogesterone, respectively, the former having the following properties: M. P., about 216–217° C.; $[\alpha]_D^{23}$ +191° (c., 0.74 in chloroform); activity equal to cortisone acetate in liver glycogen assay, and twice that of desoxycorticosterone acetate in sodium retention assay. Also, oxidation of the 9α-fluoro-11β-hydroxyprogesterone (or the corresponding chloro or iodo compounds) with chromic acid in the same manner as 9α-bromo-11-β-hydroxyprogesterone (cf. section *a* of Example 17) yields 9α-fluoro-11-ketoprogesterone (and the corresponding chloro iodo compounds, respectively).

EXAMPLE 19

*Preparation of 9α-bromo-11β-17α-dihydroxyprogesterone (LVI)*

(a) *11α-tosyloxy-17α-hydroxyprogesterone (LIV) from 11α,17α-dihydroxyprogesterone (XXVI).*—1.2 g. 11α,17α- dihydroxy-progesterone is treated with 1.4 g. p-toluenesulfonyl chloride, and the reaction mixture worked up as described in section *b* of Example 1. The resulting tosylate (weighing 1.7 g.), after recrystallization from acetone, has the following properties; M. P. about 143–146° (dec.); $[\alpha]_D^{23}$ +48° (c., 0.29 in CHCl$_3$);

$\lambda_{max.}^{ethanol}$ 229 m$\mu$($\epsilon$=26,500), 274 m$\mu$($\epsilon$=606), 285 m$\mu$ ($\epsilon$=305). $\lambda_{max.}^{Nujol}$ 303$\mu$(OH); 5.88$\mu$, 5.99$\mu$, 6.05$\mu$ analysis [calculated for C$_{28}$H$_{36}$O$_5$S (500.63).. C, 67.17; H, 7.25; S, 6.44; found (approximately): C, 67.08; H, 7.52; S, 6.35].

(*a: alternative*) *11α-mesyloxy-17α-hydroxyprogesterone (LX) from 11α,17α - dihydroxyprogesterone (XXVI)*.—117 mg. 11α,17α-dihydroxyprogesterone is dissolved in 5 ml. pyridine, cooled to 0°, and 0.04 ml. methanesulfonyl chloride (1.5 equivalents) is added. The mixture is left standing in the icebox for 8 hours. The excess methanesulfonyl chloride is then destroyed with ice, the mixture diluted with chloroform, washed with 1 N HCl, sodium bicarbonate solution and water, dried over sodium sulfate, and evaporated. On crystallization from ethanol there is obtained about 65 mg. of the product, having the following properties: M. P. about 150–152° (dec.); $[\alpha]_D^{23}$ +64° (c.=.49 in CHCl$_3$);

$\lambda_{max.}^{EtOH}$ 238 m$\mu$($\epsilon$=18,200), 285 m$\mu$($\epsilon$=277); $\lambda_{max.}^{Nujol}$ 5.90$\mu$, 6.04$\mu$, 6.11$\mu$, 6.24$\mu$ analysis [calculated for C$_{22}$H$_{32}$O$_6$S (424.54): C, 62.24; H, 7.60; S, 7.55; found: C, 62.11; H, 7.71; S, 7.11]. The mother liquors yield about 50 mg. additional product.

(*b*) *Δ$^{4,9(11)}$-pregnadiene-17α-ol-3,20-dione (LV) from 11α-tosyloxy-17α-hydroxyprogesterone (LIV)*.—1.19 g. 11α-tosyloxy-17α-hydroxyprogesterone is treated with 2.4 g. anhydrous sodium acetate in 25 ml. glacial acetic acid, and the reaction mixture worked up as described in section *c* of Example 1. The residue (about 693 mg.) crystallizes readily from acetone, yielding about 520 mg. pure Δ$^{4,9(11)}$-pregnadiene-17α-ol-3,20-dione, having the following properties: M. P. about 214–216°, $[\alpha]_D^{23}$ +67° (c., 0.82 in CHCl$_3$);

$\nu_{max.}^{alc.}$ 239 m$\mu$($\epsilon$=18,450); $\lambda_{max.}^{Nujol}$ 2.88$\mu$(OH), 5.87$\mu$(20-ketone), 5.99$\mu$, 6.04$\mu$, 6.16$\mu$(Δ$^4$=3-ketone)

analysis [calculated for C$_{21}$H$_{28}$O$_3$ (328.44): C, 76.79; H, 8.59; found (approximately): C, 76.52; H, 8.46].

Alternatively, 11α-mesyloxy-17α-hydroxyprogesterone can be converted into Δ$^{4,9(11)}$-pregnadiene-17α-ol-3,20-dione by the foregoing procedure.

(*c*) *9α-bromo-11β,17α-dihydroxyprogesterone (LVI) from Δ$^{4,9(11)}$-pregnadiene-17α-ol-3,20-dione (LV)*.—330 mg. of Δ$^{4,9(11)}$-pregnadiene-17α-ol-3,20-dione is treated with 200 mg. N-bromoacetamide, and the reaction mixture worked up as described in section *d* of Example 1. The resulting crude product (about 450 mg.) is recrystallized from acetone-chloroform, and yields about 362 mg. (85%) pure 9α-bromo-11β,17α-dihydroxyprogesterone, having the following properties: M. P. about 189–191° (dec.); $[\alpha]_D^{23}$ +128° (c., 0.33 in CHCl$_3$);

$\lambda_{max.}^{alc.}$ 243 m$\mu$($\epsilon$=16,700); $\lambda_{max.}^{Nujol}$ 2.88$\mu$(OH), 5.86$\mu$(20-ketone), 6.04$\mu$, 6.08$\mu$(Δ$^4$=3-ketone)

analysis [calculated for C$_{21}$H$_{29}$O$_4$Br (425.36): C, 59.29; H, 6.87; Br, 18.79; found (approximately): C, 59.59; H, 6.81; Br, 18.61].

EXAMPLE 20

*Preparation of 9α-chloro-11-keto-17α-hydroxyprogesterone (LIX)*

(*a*) *Δ$^4$ - pregnene - 9β,11β - oxido - 17α - ol - 3,20-dione (LVII) from 9α-bromo-11β,17α-dihydroxy-progesterone (LVI)*.—A solution of 247 mg. 9α-bromo-11β,17α-dihydroxyprogesterone and 630 mg. anhydrous potassium acetate is refluxed for 90 minutes. The reaction mixture is worked up as described in section *a* of Example 4. The resulting crude residue is recrystallized from acetone-hexane, yielding pure Δ$^4$-pregnene-9β,11β-oxido-17α-ol-3,20-dione of the following properties: M. P. about 197–199°; $[\alpha]_D^{23}$ +6° (c., 0.32 in CHCl$_3$);

$\lambda_{max.}^{alc.}$ 243 m$\mu$($\epsilon$=15,200), 283 m$\mu$($\epsilon$=630); $\lambda_{max.}^{Nujol}$ 2.86$\mu$, 3.05$\mu$(OH), 5.89$\mu$(20—CO), 6.04$\mu$(Δ$^4$=3-ketone)

analysis [calculated for C$_{21}$H$_{28}$O$_4$ (344.44): C, 73.22; H, 8.18; found (approximately): C, 72.99; H, 8.11].

(*b*) *9α-chloro-11β,17α-dihydroxyprogesterone (LVIII) from Δ$^4$ - pregnene - 9β,11β - oxido - 17α - ol - 3,20-dione (LVII)*.—42 mg. Δ$^4$-pregnene-9β,11β-oxido-17α-ol-3,20-dione is dissolved in 3 ml. chloroform, and reacted with 0.7 ml. 0.456 N HCl in chloroform at 0° for one hour. The reaction mixture is worked up as described in Example 7. The resulting residue (about 42 mg.), after crystallization from acetone-chloroform-hexane, affords pure 9α - chloro - 11β,17α - dihydroxyprogesterone having the following properties, M. P. about 245–246° (dec.), $[\alpha]_D^{23}$ +138° (c., 0.35 in dioxane):

$\lambda_{max.}^{alc.}$ 238 m$\mu$($\epsilon$=17,300); $\lambda_{max.}^{Nujol}$ 2.91$\mu$(OH), 5.90$\mu$(20-ketone), 6.05$\mu$($\epsilon^4$=3-ketone)

analysis [calculated for C$_{21}$H$_{29}$O$_4$Cl (380.90): C, 66.21; H, 7.67; Cl, 9.31; found (approximately): C, 66.18; H, 7.38; Cl, 9.64].

(*c*) *9α-chloro-11-keto-17α-hydroxyprogesterone (LIX) from 9α-chloro-11β,17α-dihydroxyprogesterone (LVIII)*.—41 mg. 9α-chloro-11β,17α-dihydroxyprogesterone is oxidized in 10 ml. of glacial acetic acid with 15 mg. of chromic acid. The reaction mixture is worked up as described in section *e* of Example 1. Crystallization from acetone-chloroform-hexane yields 9α-chloro-11-keto-17α-hydroxyprogesterone having the following properties: M. P. about 260–261° (dec.); $[\alpha]_D^{23}$ +177° (c., 0.17 in CHCl$_3$); analysis [calculated for C$_{21}$H$_{27}$O$_4$Cl (378.89): C, 66.57; H, 7.18; found (approximately): C, 66.12; H, 7.45].

Following the procedure in section *b*, but using hydrogen fluoride or hydriodic acid in place of hydrochloric acid, there is obtained 9α-fluoro-11β,17α-dihydroxyprogesterone and 9α-iodo-11β,17α-dihydroxyprogesterone, respectively the former having the following properties: M. P., about 274–276° C.; $[\alpha]_D^{23}$ +136° (c., 0.3 in dioxane); activity, one-third that of cortisone acetate in liver glycogen assay. These may be oxidized by the procedure of section *e*, yielding, for example, 9α-fluoro-11-keto-17α-hydroxyprogesterone.

I claim:

1. A steroid of the pregnane series having a 9α-halogen substitutent and a 11-substitutent of the group consisting of keto and β-hydroxy.

2. Δ$^4$-3,20-diketo steroids of the pregnene series having a 9α-halogen substitutent and a 11-substituent of the group consisting of keto and β-hydroxy.

3. Δ$^4$-21-hydroxy-3,20-diketo steroids of the pregnene series having a 9α-halogen substituent and a 11-substituent of the group consisting of keto and β-hydroxy.

4. A member of the group consisting of 9α-halo-Δ$^4$-pregnene-11β,17α,21-triol-3,20-diones and 21-lower fatty acid esters thereof.

5. A member of the group consisting of 9α-fluoro-Δ$^4$-pregnene-11β,17α,21-triol-3,20-dione and 21-lower fatty acid esters thereof.

6. A member of the group consisting of 9α-(chloro)-Δ$^4$ - pregnene - 11β,17α,21-triol-3,20-dione and 21-lower fatty acid esters thereof.

7. A member of the group consisting of 9α-(bromo)-Δ$^4$ - pregnene - 11β,17α,21-triol-3,20-dione and 21-lower fatty acid esters thereof.

8. A member of the group consisting of 9α-halocortisones and 21-lower fatty acid esters thereof.

9. A member of the group consisting of 9α-(fluoro)-cortisone and 21-lower fatty acid esters thereof.

10. A member of the group consisting of 9α-(chloro)-cortisone and 21-lower fatty acid esters thereof.
11. A member of the group consisting of 9α-(bromo)-cortisone and 21-lower fatty acid esters thereof.
12. A member of the group consisting of 9α-halo-corticosterones and 21-lower fatty acid esters thereof.
13. A member of the group consisting of 9α-(fluoro)-corticosterone and 21-lower fatty acid esters thereof.
14. A member of the group consisting of 9α-(chloro)-corticosterone and 21-lower fatty acid esters thereof.
15. A member of the group consisting of 9α-(bromo)-corticosterone and 21-lower fatty acid esters thereof.
16. 9α-bromo-11β-hydroxy progesterone.
17. 9α-chloro-11β-hydroxy progesterone.
18. 9α-fluoro-11β-hydroxy progesterone.
19. 9α-bromo-11β,17α-dihydroxyprogesterone.
20. 9α-chloro-11β,17α-dihydroxyprogesterone.
21. 9α-fluoro-11β,17α-dihydroxyprogesterone.
22. A member of the group consisting of 9α-halo-11-dehydrocorticosterones and lower fatty acid esters thereof.
23. A member of the group consisting of 9α-(fluoro)-11-dehydrocorticosterone and lower fatty acid esters thereof.
24. A member of the group consisting of 9α-(chloro)-11-dehydrocorticosterone and lower fatty acid esters thereof.
25. A member of the group consisting of 9α-(bromo)-11-dehydrocorticosterone and lower fatty acid esters thereof.
26. A 9β,11β-oxido steroid of the pregnane series.
27. Δ⁴-3,20-diketo steroids of the pregnene series having a 9β,11β-oxido group.
28. Δ⁴-21-hydroxy-3,20-diketo steroids of the pregnene series having a 9β,11β-oxido group.
29. Δ⁴-17α,21-dihydroxy-3,20-diketo steroids of the pregnene series having a 9β,11β-oxido group.
30. In the process of preparing a 11β-hydroxy steroid of the pregnane series, the step of converting a Δ⁹,¹¹ steroid of the series into the corresponding 9α-bromo 11β-hydroxy compound by reacting the former with an N-bromo-amide of a carboxylic acid in the presence of perchloric acid.
31. In the process of preparing a 9α-halo-11β-hydroxy steroid of the pregnane series, the step of converting a 9α-bromo 11β-hydroxy steroid of the series into the corresponding 9β,11β-oxido steroid by reacting the former with potassium acetate in an organic solvent thereof.
32. The process of preparing a 9α-halo-11β-hydroxy steorid of the pregnane series, which comprises reacting the corresponding 9β,11β-oxido steroid with a hydrohalic acid in an inert, non-hydroxylated organic solvent.
33. 9α-halo-11β-hydroxyprogesterone.
34. 9α-halo-11-keto-17α-hydroxyprogesterone.
35. 9α-halocorticosterone.
36. 9α-halo-11β,17α-dihydroxyprogesterone.
37. 9α-fluoro-Δ⁴-pregnene-11β,17α,21-triol-3,20-dione.
38. A halo steroid of the general formula

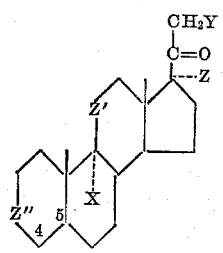

wherein the 4,5-position linkage is a member of the class consisting of single and double bond linkages, Z" is a member of the class consisting of

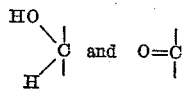

Z' is a member of the class consisting of

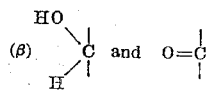

X is an (α) halogen group, Y is a member of the class consisting of —H, —OH, and —O-(lower-fatty-acid acyl), and Z is a member of the class consisting of —H and —(α)OH.

39. A 9β,11β-oxido steroid of the general formula

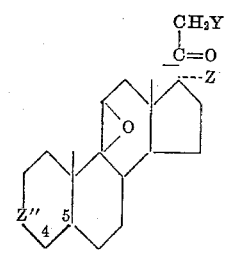

wherein the 4,5-position linkage is a member of the class consisting of single and double bond linkages, Z" is a member of the class consisting of

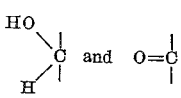

Y is a member of the class consisting of —H, —OH, —O-(lower-fatty-acid acyl), and Z is a member of the class consisting of —H and —(α)OH.

40. Δ⁴-pregnene-9β,11β-oxido-17α,21-diol-3,20-dione.
41. Δ⁴-pregnene-9β,11β-oxido-17α,21-diol-3,20-dione-21-acetate.
42. 9α-fluorohydrocortisone acetate.
43. 9α-halo-11-ketoprogesterone.
44. A compound selected from the class consisting of 9α-fluoro-Δ⁴-pregnene-17α,21-diol-3,11,20-trione and 21-acetate thereof.
45. 9β,11β-oxido-Δ⁴-pregnene-21-ol-3,20-dione 21-acetate.
46. 9β,11β-oxidoprogesterone.
47. 9β,11β-epoxy-17α-hydroxyprogesterone.
48. The process of preparing a steroid of the pregnane series having a 9α-halogen substituent and an 11-substituent of the group consisting of keto and β-hydroxy, which comprises reacting the corresponding 9β,11β-oxido steroid with a hydrohalic acid.
49. The process of preparing a steroid of the pregnane series having a 9α-bromo substituent and an 11-substituent of the group consisting of keto and β-hydroxy, which comprises reacting the corresponding Δ⁹,¹¹-steroid with an N-bromo-amide.
50. The process of preparing Δ⁴-3,20-diketo steroids of the pregnene series having a 9α-halogen substituent and an 11-substituent of the group consisting of keto and β-hydroxy, which comprises reacting the corresponding 9β,11β-oxido steroid with a hydrohalic acid.
51. The process of claim 50 wherein the hydrohalic acid is hydrochloric acid.
52. The process of claim 50 wherein the hydrohalic acid is hydrofluoric acid.

References Cited in the file of this patent

UNITED STATES PATENTS

| 2,730,525 | Hogg et al. | Dec. 17, 1954 |
| 2,707,190 | Farrar | Apr. 26, 1955 |
| 2,728,783 | Graber et al. | Dec. 27, 1955 |
| 2,790,814 | Hogg et al. | Apr. 30, 1957 |

UNITED STATES PATENT OFFICE
Certificate of Correction

Patent No. 2,852,511  
Josef Fried  
September 16, 1958

It is hereby certified that error appears in the printed specification of the above numbered patent requiring correction and that the said Letters Patent should read as corrected below.

Column 1, lines 45 to 55, the formula should appear as shown below instead of as in the patent—

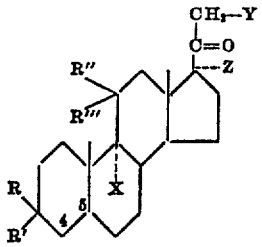

column 3, lines 17 to 26, the second formula should appear as shown below instead of as in the patent—

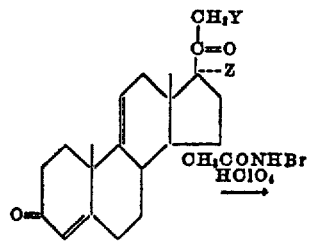

line 28, between the structural formulae, for "CH$_3$COOH" read —CH$_3$COOH—; lines 34 to 42, the second formula should appear as shown below instead of as in the patent—

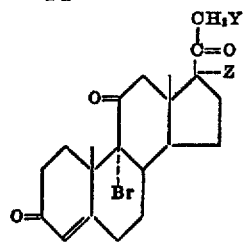

lines 49 to 58, the second formula should appear as shown below instead of as in the patent—

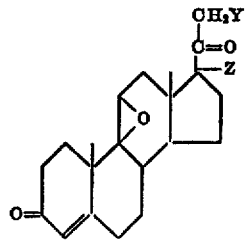

column 5, line 51, after "sodium" insert —sulfite—; column 6, line 38, for "606μ" read —6.06μ—; column 8, line 35, for "C, 59.16;" read —C, 59.15;—; column 9, line 48, first line after the formula, for "Y=OAc Z=" read —Y=OAc; Z= —; column 13, line 68, for "c., 65.62;" read —C, 65.62;—; column 14, line 3, for "608μ" read —6.08μ—; column 15, line 59, for "lever" read —liver—; column 16, line 25, for "mixture M. P." read —mixed M. P.—; line 41, for "6.3 m. chloroform" read —6.3 ml. chloroform—; line 67, for "9α-bromo-11-β-hydroxyprogesterone" read —9α-bromo-11β-hydroxyprogesterone—; line 69, after "chloro" insert —and—; column 17, line 5, for "following properties;" read —following properties:—; line 42, for $\gamma^{alc.}_{max.}$ read $\lambda^{alc.}_{max.}$ column 18, line 19, for "following properties," read —following properties:—; line 23, for "(є⁴=3-ketone)" read —(є⁴-3-ketone)—; line 44, after "respectively" insert a comma; lines 52, 55, and 58, for "and a 11-substituent" read —and an 11-substituent—; column 19, line 32, for "Δ⁴ 3,20-diketo steroids" read —Δ⁴-3,20-diketo steroids—; line 50, for "steorid" read —steroid—; column 20, lines 14 to 23, the formula should appear as shown below instead of as in the patent—

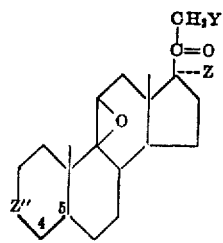

line 35, before "—O-(lower-fatty-acid acyl)" insert —and—.
Signed and sealed this 16th day of June 1959.

[SEAL]

Attest:
KARL H. AXLINE,
*Attesting Officer.*

ROBERT C. WATSON,
*Commissioner of Patents.*